United States Patent
Urmanov et al.

(10) Patent No.: US 11,178,161 B2
(45) Date of Patent: Nov. 16, 2021

(54) DETECTING ANOMALIES DURING OPERATION OF A COMPUTER SYSTEM BASED ON MULTIMODAL DATA

(71) Applicant: Oracle International Corporation, Redwood Shores, CA (US)

(72) Inventors: Aleksey M. Urmanov, San Diego, CA (US); Alan Paul Wood, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 357 days.

(21) Appl. No.: 16/388,057

(22) Filed: Apr. 18, 2019

(65) Prior Publication Data

US 2020/0336500 A1 Oct. 22, 2020

(51) Int. Cl.
*H04L 29/06* (2006.01)
*G06F 17/16* (2006.01)
(Continued)

(52) U.S. Cl.
CPC ........ *H04L 63/1425* (2013.01); *G06F 16/906* (2019.01); *G06F 16/9035* (2019.01); *G06F 17/16* (2013.01); *H04L 63/0815* (2013.01)

(58) Field of Classification Search
CPC ............. H04L 63/1425; H04L 63/0815; G06F 16/906; G06F 16/9035; G06F 17/16;
(Continued)

(56) References Cited

U.S. PATENT DOCUMENTS

| 5,040,133 A | 8/1991 | Feintuch et al. |
| 5,987,399 A | 11/1999 | Wegerich et al. |

(Continued)

FOREIGN PATENT DOCUMENTS

WO 9957686 11/1999

OTHER PUBLICATIONS

U.S. Appl. No. 13/969,771, filed Aug. 19, 2013, and office actions from various dates.
(Continued)

*Primary Examiner* — Joseph P Hirl
*Assistant Examiner* — Chi D Nguy
(74) *Attorney, Agent, or Firm* — Park, Vaughan, Fleming & Dowler LLP

(57) ABSTRACT

The system obtains a multimodal dataset containing different types of data gathered during operation of the computer system, wherein the multimodal dataset includes time-series data for different variables associated with operation of the computer system. Next, the system forms a set of feature groups from the multimodal dataset, wherein each feature group comprises variables from the multimodal dataset containing the same type of data. The system then computes a tripoint similarity matrix for each feature group, and aggregates the tripoint similarity matrices for the feature groups to produce a crossmodal tripoint similarity matrix. Next, the system uses the crossmodal tripoint similarity matrix to cluster the multimodal dataset to form a model. The system then performs prognostic-surveillance operations on real-time multimodal data received from the computer system, wherein the prognostic-surveillance operations use the model as a classifier to detect anomalies. When an anomaly is detected, the system triggers an alert.

20 Claims, 11 Drawing Sheets

(51) Int. Cl.
*G06F 16/9035* (2019.01)
*G06F 16/906* (2019.01)

(58) Field of Classification Search
CPC ...... G06F 21/55; G06F 21/552; G06F 21/554; G06F 21/566
See application file for complete search history.

(56) References Cited

U.S. PATENT DOCUMENTS

| | | | |
|---|---|---|---|
| 6,049,797 | A | 4/2000 | Guha et al. |
| 6,092,072 | A | 7/2000 | Guha et al. |
| 6,208,997 | B1 | 3/2001 | Sigeti et al. |
| 6,882,998 | B1 | 4/2005 | Stemp |
| 7,660,775 | B2 | 2/2010 | Bougaev et al. |
| 7,739,143 | B1 | 6/2010 | Dwarakanath et al. |
| 7,739,284 | B2 | 6/2010 | Aggarwal et al. |
| 7,761,350 | B1 | 7/2010 | Ridgeway |
| 7,783,510 | B1 | 8/2010 | Gilgur et al. |
| 7,987,106 | B1 | 7/2011 | Aykin |
| 8,200,454 | B2 | 6/2012 | Dorneich et al. |
| 8,229,876 | B2 | 7/2012 | Roychowdhury |
| 8,234,236 | B2 | 7/2012 | Beaty et al. |
| 8,363,961 | B1 | 1/2013 | Avidan et al. |
| 8,576,964 | B2 | 11/2013 | Taniguchi et al. |
| 8,583,649 | B2 | 11/2013 | Ailon et al. |
| 8,635,328 | B2 | 1/2014 | Corley et al. |
| 8,694,969 | B2 | 4/2014 | Bernardini et al. |
| 8,880,525 | B2 | 11/2014 | Galle et al. |
| 9,053,171 | B2 | 6/2015 | Ailon et al. |
| 9,147,167 | B2 | 9/2015 | Urmanov et al. |
| 9,330,119 | B2 | 5/2016 | Chan et al. |
| 9,355,357 | B2 | 5/2016 | Hao et al. |
| 9,495,395 | B2 | 11/2016 | Chan et al. |
| 9,514,213 | B2 | 12/2016 | Wood et al. |
| 9,692,662 | B2 | 6/2017 | Chan et al. |
| 9,710,493 | B2 | 7/2017 | Wang et al. |
| 9,843,596 | B1 * | 12/2017 | Averbuch .............. G06F 21/552 |
| 2002/0099675 | A1 | 7/2002 | Agrafiotis et al. |
| 2002/0147703 | A1 | 10/2002 | Yu et al. |
| 2003/0224344 | A1 | 12/2003 | Shamir et al. |
| 2006/0161592 | A1 | 7/2006 | Ertoz et al. |
| 2008/0010304 | A1 | 1/2008 | Vempala et al. |
| 2008/0181503 | A1 | 7/2008 | Schclar et al. |
| 2008/0275862 | A1 | 11/2008 | Liu et al. |
| 2010/0027552 | A1 | 2/2010 | Hill |
| 2010/0067745 | A1 | 3/2010 | Kovtun et al. |
| 2011/0040575 | A1 | 2/2011 | Wright et al. |
| 2011/0071624 | A1 | 3/2011 | Finch et al. |
| 2011/0105885 | A1 | 5/2011 | Liew et al. |
| 2011/0125894 | A1 | 5/2011 | Anderson et al. |
| 2011/0126197 | A1 | 5/2011 | Larsen et al. |
| 2011/0126275 | A1 | 5/2011 | Anderson et al. |
| 2012/0054184 | A1 | 3/2012 | Masud et al. |
| 2012/0173547 | A1 | 7/2012 | Suntinger et al. |
| 2012/0254183 | A1 | 10/2012 | Ailon et al. |
| 2013/0016584 | A1 | 1/2013 | Zhou et al. |
| 2013/0271463 | A1 | 10/2013 | Curington et al. |
| 2013/0326202 | A1 | 12/2013 | Rosenthal et al. |
| 2014/0006403 | A1 | 1/2014 | King et al. |
| 2014/0067757 | A1 | 3/2014 | Ailon et al. |
| 2014/0143182 | A1 | 5/2014 | Urmanov et al. |
| 2014/0280146 | A1 | 9/2014 | Wood et al. |
| 2014/0379717 | A1 | 12/2014 | Urmanov et al. |
| 2015/0248446 | A1 | 9/2015 | Nordstrom et al. |
| 2015/0294052 | A1 * | 10/2015 | Urmanov ................. G06F 17/18 703/2 |
| 2016/0283533 | A1 | 9/2016 | Urmanov et al. |
| 2016/0299961 | A1 | 10/2016 | Olsen |
| 2019/0219994 | A1 * | 7/2019 | Yan ........................ G05B 17/02 |

OTHER PUBLICATIONS

U.S. Appl. No. 14/251,867, filed Apr. 14, 2014, and office actions from various dates.
U.S. Appl. No. 14/669,729, filed Mar. 26, 2015, and office actions from various dates.
U.S. Appl. No. 14/669,792, filed Mar. 26, 2015, and office actions from various dates.
Banfield et al.; "Model-Based Gaussian and Non-Gaussian Clustering", Biometrics, vol. 49, No. 3 (Sep. 1993), pp. 803-821, Published by: International Biometric Society.
Basu et al.; "Assisting Users with Clustering Tasks by Combining Metric Learning and Classification", Association for the Advancement of Artificial Intelligence (www.aaai.org) 2010.
Choi et al.; "A Survey of Binary Similarity and Distance Measures", Systemics, Cybernetics and Informatics, vol. 8—No. 1, year 2010.
Davies et al.; "A Cluster Separation Measure", IEEE Transactions on Pattern Analysis and Machine Intelligence, vol. PAMI-1, No. 2, Apr. 1979, pp. 224-227.
Ding et al.; "A MinMaxCut Spectral Method for Data Clustering and Graph Partitioning", LBNL Tech Report #54111, Dec. 1, 2003.
Erten et al.; "Triangulations with Locally Optimal Steiner Points", Eurographics Symposium on Geometry Processing (2007)_, pp. 1-10.
Ester et al.; "A Density-Based Algorithm for Discovering Clusters in Large Spatial Databases with Noise", KDD-96 proceedings, 1996, AAAI (www.aaai.org).
Fabris et al.; "A Multi-Measure Nearest Neighbor Algorithm for Time Series Classification", Advances in Artificial Intelligence— Iberamia 2008, Lecture Notes in Computer Science—vol. 5290, 2008; pp. 1-7.
Han et al.; "Data Mining: Concepts and Techniques", University of Illinois at Urbana-Champaign, 2006, Morgan Kaufmann Publishers, pp. 1-28, San Francisco, CA.
Haugen et al.; "Extracting Common Time Trends from Concurrent Time Series: Maximum Autocorrelation Factors with Applications", Stanford University, Oct. 20, 2015, pp. 1-38.
Heinrich et al.; "Multi-distance motion vector clustering algorithm for video-based sleep analysis", 2013 IEEE 15th International Conference on e-Health Networking, Applications and Services (Healthcom 2013).
Hodge et al.; "A Survey of Outlier Detection Methodologies", Artificial Intelligence Review 22, 2004, pp. 85-126, Kluwer Academic Publishers, Printed in the Netherlands.
Hu et al.; "Pairwise Constrained Clustering with Group Similarity-Based Patterns", 2010 Ninth International Conference on Machine Learning and Applications, pp. 260-265.
Jarvis et al.; "Clustering Using a Similarity Measure Based on Shared Near Neighbors", IEEE Transactions on Computers, vol. C-22, No. 11, Nov. 1973.
Jaskowiak et al.; "On the selection of appropriate distances for gene expression data clustering", BMC Bioinformatics 2014, 15 (Suppl 2) S2 http://biomedcentral.com/1471-2105/15/S2/S2, The Twelfth Asia Pacific Bioinformatics Conferance (APBC) Shanghai, China Jan. 17-19, 2014.
Johnson; "Hierarchical Clustering Schemes", Psychometrika—vol. 32, No. 3, Sep. 1967.
Kohonen; "Self-Organized Formation of Topologically Correct Feature Maps", Biological Cybernetics 43, 59-69 (1982).
Lewis et al.; Triangulation of planar regions with applications, 1976, The Computer Journal, pp. 324-332.
Luo et al.; "A Probabilistic Framework for Graph Clustering", IEEE pp. I-912, 2001.
Macqueen; "Some Methods for Classification and Analysis of Multivariate Observations", University of California, Los Angeles, Proceedings of Fifth Berkeley Symposium on Mathematical Statistics and Probability, 1967, pp. 281-297 University of California, Los Angeles, CA.
Molodykh et al.; "Operating Model of Knowledge Quantum Engineering for Decision-Making in Conditions of Indeterminancy" International Journal "Information Theories & Applications", vol. 14 / 2007.
Parker et al.; "Supervised Risk Predictor of Brest Cancer Based on Intrinsic Subtypes", Journal of Clinical Oncology, vol. 27, No. 8, Mar. 10, 2009 by American Society of Clinical Oncology.

(56) References Cited

OTHER PUBLICATIONS

Pothen et al.; "Partitioning Sparse Matrices with Eigenvectors of Graphs", Siam J. Matrix Anal. Appl. vol. 11, No. 3, pp. 430-452, Jul. 1990, Society for Industrial and Applied Mathematics.
Scholkopf et al.; "Support Vector Method for Novelty Detection", in NIPS, vol. 12, 1999, pp. 582-588.
Slipetskyy; "Security Issues in OpenStack", Master's Thesis, Technical University of Denmark, Jun. 2011.
Somlo et al; "Incremental Clustering for Profile Maintenance in Information Gathering Web Agents", Agents '01, Montreal, Quebec, Canada, May 28-Jun. 1, 2001, pp. 262-269.
Szmit et al.; "Usage of Modified Hold-Winters Method in the Anomaly Detection of Network Traffic: Case Studies", Hindawi Publishing Corporation, Journal of Computer Networks and Communications, vol. 2012, Article ID 192913, 5 pages, doi:10.1155/2012/192913, Mar. 29, 2012.
Taylor et al; "Forecasting intraday time series with multiple seasonal cycles using parsimonious seasonal exponential smoothing", Omega 40 (2012) 748-757, www.elsevier.com/locate/omega, 2011 Elsevier Ltd.
Trosset; "Representing Clusters: K-Means Clustering, Self-Organizing Maps, and Multidimensional Scaling", Apr. 6, 2006, pp. 1-17, Department of Mathematics, College of William and Mary.
Vlachos et al.; "A Multi-Metric Index for Euclidean and Periodic Matching", in Principles of Data Mining and Knowledge Discovery, 2005; pp. 355-366.
Voras et al.; "Criteria for Evaluation of Open Source Cloud Computing Solutions", Proceedings of the ITI 2011 33rd Int. Conf. on Information Technology Interfaces, Jun. 27-30, 2011, Cavtat Croatia.
Wikipedia; Iris Flower Data Set; downloaded Jan. 30, 2019, htttps://en.wikipedia.org/wiki/Iris_flower_data_set, pp. 1-5.
Zhang et al.; "Real-time forecasting of online auctions via functional K-nearest neighbors", International Journal of Forecasting 26 (201) 666-683, ScienceDirect.
Zhou et al.; "Graph Clustering Based on Structural/Attribute Similarities", pp. 718-729, VLDB '09, Aug. 24-28, 2009, Lyon France.

\* cited by examiner

| Timestamp (UTC) | IP | Resource | Status | Country | City | Latitude | Longitude |
|---|---|---|---|---|---|---|---|
| 2018-03-26 03:30:03 | Public IP 1 | Resource 1 | 1 | United States | City 1 | 37.603 | -122.247 |
| 2018-03-27 01:24:56 | Public IP 2 | Resource 1 | 1 | United States | City 1 | 37.603 | -122.247 |
| 2018-03-27 01:26:11 | Public IP 3 | Resource 1 | 1 | United States | City 1 | 37.603 | -122.247 |
| 2018-04-14 23:17:09 | Private IP 1 | Resource 1 | 1 | United States | City 2 | 32.991 | -117.226 |
| 2018-04-17 01:13:05 | Private IP 2 | Resource 2 | 1 | United States | City 2 | 32.991 | -117.226 |
| 2018-04-27 23:59:08 | Private IP 3 | Resource 3 | 1 | United States | City 2 | 32.991 | -117.226 |
| 2018-05-05 06:28:34 | Private IP 4 | Resource 4 | 1 | United States | City 2 | 32.991 | -117.226 |
| 2018-05-05 06:28:18 | Private IP 5 | Resource 5 | 1 | United States | City 2 | 32.991 | -117.226 |
| 2018-05-09 23:59:18 | Private IP 6 | Resource 4 | 1 | United States | City 2 | 32.991 | -117.226 |
| 2018-05-10 08:34:38 | Private IP 7 | Resource 5 | 1 | United States | City 3 | 39.865 | -105.035 |
| 2018-05-10 01:23:08 | Private IP 8 | Resource 6 | 1 | United States | City 2 | 32.991 | -117.226 |
| 2018-05-11 04:08:18 | Private IP 9 | Resource 7 | 1 | United States | City 2 | 32.991 | -117.226 |

FIG. 2

$$\begin{bmatrix} v_{1,1} & v_{1,2} & \cdots & v_{1,k} \\ \cdots & \cdots & \cdots & \cdots \\ v_{i,1} & v_{i,2} & \cdots & v_{i,k} \\ \cdots & \cdots & \cdots & \cdots \\ v_{n,1} & v_{n,2} & \cdots & v_{n,k} \end{bmatrix} \begin{bmatrix} c_{1,1} & c_{1,2} & \cdots & c_{1,k} \\ \cdots & \cdots & \cdots & \cdots \\ c_{i,1} & c_{i,2} & \cdots & c_{i,k} \\ \cdots & \cdots & \cdots & \cdots \\ c_{n,1} & c_{n,2} & \cdots & c_{n,k} \end{bmatrix}$$

FIG. 3

1. S_CM = S_FG1
2. FOR g=2,3,...,ng
3.   FOR each matrix entry (i,j)
4.     IF S_CM(i,j) >= 0 AND S_FGg(i,j) >= 0
5.       S_CM(i,j) = S_CM(i,j) + S_FGg(i,j) − S_CM(i,j)*S_FGg(i,j)
6.     ELSE IF S_CM(i,j) <= 0 AND S_FGg(i,j) <= 0
7.       S_CM(i,j) = S_CM(i,j)+ S_FGg(i,j) + S_CM(i,j)*S_FGg(i,j)
8.     ELSE
9.       S_CM(i,j) = (S_CM(i,j) + S_FGg(i,j)) /
10.       (1 − MIN(ABS(S_CM(i,j)), ABS(S_FGg(i,j))))
11.     END IF
12.   END FOR
13. END FOR

FIG. 7

1. Given: dataset D with feature groups
2. Compute sparse similarity matrix S
3. Compute stages of S
4. Compute anchors of S
5. Create a temporary row assignment array *rowAssignments*
6. Create a temporary repesentatives-to-anchor assignments array *repAssignments*
7. Cluster ancors using Power Iteration-based Spectral Partitioner
8. Find boundary anchors − the ones at the interface of anchor clusters
9. Assign representatives to anchors in *repAssignments*
10. Assign all rows to representatives in *rowAssignments*
11. Reassign all rows to anchors in *rowAssignments*
12. Relabel anchors to clusters in *rowAssignments*
13. Refine cluster boundaries
14. Output: *rowAssignments* contains cluster labels

FIG. 8

2. Compute stages of S:
2.0 Given: Precomputed stage 0 similarity, S0
2.1 Create a temporary array rowAssignments // initialize with −1
2.2 FOR each unassigned row i
2.3 rowAssignments[i] = i // make row i a representative
2.4 FOR each unassigned row j
2.5 IF S0(i,j)>0 // row i and row j are similar
2.6 rowAssignments[j] = i // assign row j to the neighborhood of row i
2.7 END IF
2.8 END FOR
2.9 END FOR
2.10 Collect all representatives into a list *repRowsList*
2.11 Create a labeled dataset from D using *repRowsList*, D1
2.12 Compute kNN column sparse similarity matrix S1 using D1
2.13 Repeat if additional stages are required

FIG. 9

3. Compute anchors of S:
3.0 Given: Precomputed stages S0 and S1
3.1 − 3.11 Similar to 2.1 − 2.11
3.12 Compute dense Tripoint similarity matrix S2 using D2
3.13 S2 contains Tripoint similarities of the anchors

FIG. 10

6. Cluster anchors using Power Iteration-based Spectral Partitioner (PISP):
6.0 Given: dense similarity matrix S
6.1 Place all rows into one cluster C1
6.2 Mark C1 as NEW
6.3 Place C1 into list of clusters CC
6.4 WHILE CC has new clusters // keep splitting new clusters
6.5 FOR each new cluster Ci in CC
6.6 Split Ci into Ci1 and Ci2 using PISP
6.7 IF SIM(Ci1,Ci2)>0 // Ci1 and Ci2 are similar
6.8 Mark Ci as OLD
6.9 ELSE // new clusters are dissimilar, keep the new clusters
6.10 Mark Ci1 and Ci2 as N
6.11 Remove Ci from CC
6.12 Add Ci1 and Ci2 to CC
6.13 END IF
6.14 END FOR
6.15 END WHILE
6.16 Merge similar clusters, if any
6.17 Output: List of clusters CC

FIG. 11

DETECTING ANOMALIES DURING OPERATION OF A COMPUTER SYSTEM BASED ON MULTIMODAL DATA

BACKGROUND

Field

The disclosed embodiments generally relate to techniques for detecting anomalous events during operation of a computer system. More specifically, the disclosed embodiments relate to a technique for detecting anomalies during operation of a computer system based on correlations determined by clustering large datasets containing multimodal data.

RELATED ART

Operational anomalies in enterprise computing systems, such as data security breaches or subsystem failures, can result in the theft of sensitive information or can cause system downtime affecting millions of customers. These types of operational anomalies can be extremely costly, which is motivating companies to seek effective techniques for detecting such anomalies.

One promising technique is to use machine-learning (ML) mechanisms to detect anomalous activity in enterprise computing systems. However, existing machine-learning techniques typically operate by analyzing only numerical data (or in some cases textual data). This means these existing techniques are presently unable to simultaneously process all of the relevant "multimodal data" that may be useful in detecting an operational anomaly, such as: event data, textual data from log files, image data, numerical integer data, and numerical floating-point data from sensors. Moreover, existing machine-learning techniques, are computationally intensive, so they are typically unable to process the extremely large datasets generated by enterprise computing systems in a reasonable amount of time.

Hence, what is needed is a new technique for detecting operational anomalies in enterprise computer systems based on large datasets of multimodal data.

SUMMARY

The disclosed embodiments provide a system that performs prognostic-surveillance operations on a computer system. During operation, the system obtains a multimodal dataset containing two or more different types of data gathered during operation of the computer system, wherein the multimodal dataset includes time-series data for different variables associated with operation of the computer system. Next, the system forms a set of feature groups from the multimodal dataset, wherein each feature group comprises variables from the multimodal dataset containing the same type of data. The system then computes a tripoint similarity matrix for each feature group in the set of feature groups, and aggregates the tripoint similarity matrices for the set of feature groups to produce a crossmodal tripoint similarity matrix. Next, the system uses the crossmodal tripoint similarity matrix to cluster the multimodal dataset to form a model. The system then performs prognostic-surveillance operations on real-time multimodal data received from the computer system, wherein the prognostic-surveillance operations use the model as a classifier to detect anomalies. Finally, if an anomaly is detected, the system triggers an alert.

In some embodiments, the multimodal dataset comprises a table with n rows, wherein each of the n rows represents an event, and wherein each column of the table contains data values for a single variable. Moreover, the tripoint similarity matrix for each of the feature groups is a sparse n×k tripoint similarity matrix V with n rows, wherein each row contains k similarity values for k nearest-neighbor rows of the row, and wherein indices for the nearest-neighbor rows are stored in an associated n×k index matrix C.

In some embodiments, while aggregating the tripoint similarity matrices, the system does the following. For each feature group in the set of ng feature groups, the system finds k nearest neighbors. Next, for each row, the system joins row indices for the k nearest-neighbor rows for all ng feature groups, and saves the joined row indices in an index matrix C for a sparse crossmodal k×ng-column nearest-neighbor tripoint similarity matrix. Then, for each feature group, the system computes similarity values for all entries of the feature group sparse tripoint similarity matrix. Finally, the system combines all feature group sparse tripoint similarity matrices into the sparse crossmodal k×ng-column nearest-neighbor tripoint similarity matrix.

In some embodiments, the system reduces the number of rows in a sparse similarity matrix by using an iterative staging process, wherein each iterative stage replaces neighborhoods of similar rows with representative rows.

In some embodiments, while aggregating the tripoint similarity matrices for the set of feature groups, the system combines similarity values from the tripoint similarity matrices for the set of feature groups. During this combining process, while combining two similarity values to produce a resulting similarity value: if the two similarity values are both positive, the resulting similarity value is greater than either of the two similarity values and is less than 1.0; if the two similarity values are both negative, the resulting similarity value is less than either of the two similarity values and is greater than −1.0; and if the two similarity values have different signs, the resulting similarity value has the sign of the largest-magnitude of the two similarity values, and the absolute value of the resulting similarity value is smaller than the absolute value of the largest-magnitude similarity value.

In some embodiments, while clustering the multimodal dataset, the system uses a tripoint clustering technique.

In some embodiments, the different types of data in the multimodal dataset include two or more of the following: textual data; event data; numerical integer data; numerical floating-point data; audio data; and image data.

In some embodiments, the different types of data in the multimodal dataset can originate from the following: a badge reader for a building that houses the computer system; a Wi-Fi system associated with the computer system; a single-sign-on system associated with the computer system; an email server for the computer system; textual data in the computer system; a biometric reader for physical access; and numerical data in the computer system.

In some embodiments, a detected anomaly can indicate one of the following: a hardware failure; a software failure; an intrusion; a malicious activity; and a performance issue.

In some embodiments, when an anomaly is detected, the system performs a remedial action, which can include one of the following: informing a system administrator about the anomaly and providing contextual information; scheduling execution of diagnostics and/or security scanning applications on the affected parts of the computer system; suspending affected users or services; enforcing multi-factor authentication for affected users or services; initiating service migration from affected parts of the system; taking actions to facilitate reallocation and/or rebalancing affected resources and services; and modifying settings of firewalls to deny or throttle traffic to affected resources or services.

BRIEF DESCRIPTION OF THE FIGURES

FIG. 2 illustrates an exemplary multimodal dataset in accordance with the disclosed embodiments.

FIG. 3 illustrates an exemplary k-column nearest-neighbor sparse similarity matrix in accordance with the disclosed embodiments.

FIG. 7 illustrates code for computing a multimodal tripoint similarity matrix in accordance with the disclosed embodiments.

FIG. 8 illustrates code for constructing a staged k-column nearest-neighbor sparse tripoint similarity matrix in accordance with the disclosed embodiments.

FIG. 9 illustrates code for computing stages of a sparse similarity matrix S in accordance with the disclosed embodiments.

FIG. 10 illustrates code for computing anchors of matrix S in accordance with the disclosed embodiments.

FIG. 11 illustrates code for computing cluster anchors using a power iteration-based spectral partitioner in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Prognostic-Surveillance System

Figure 1:
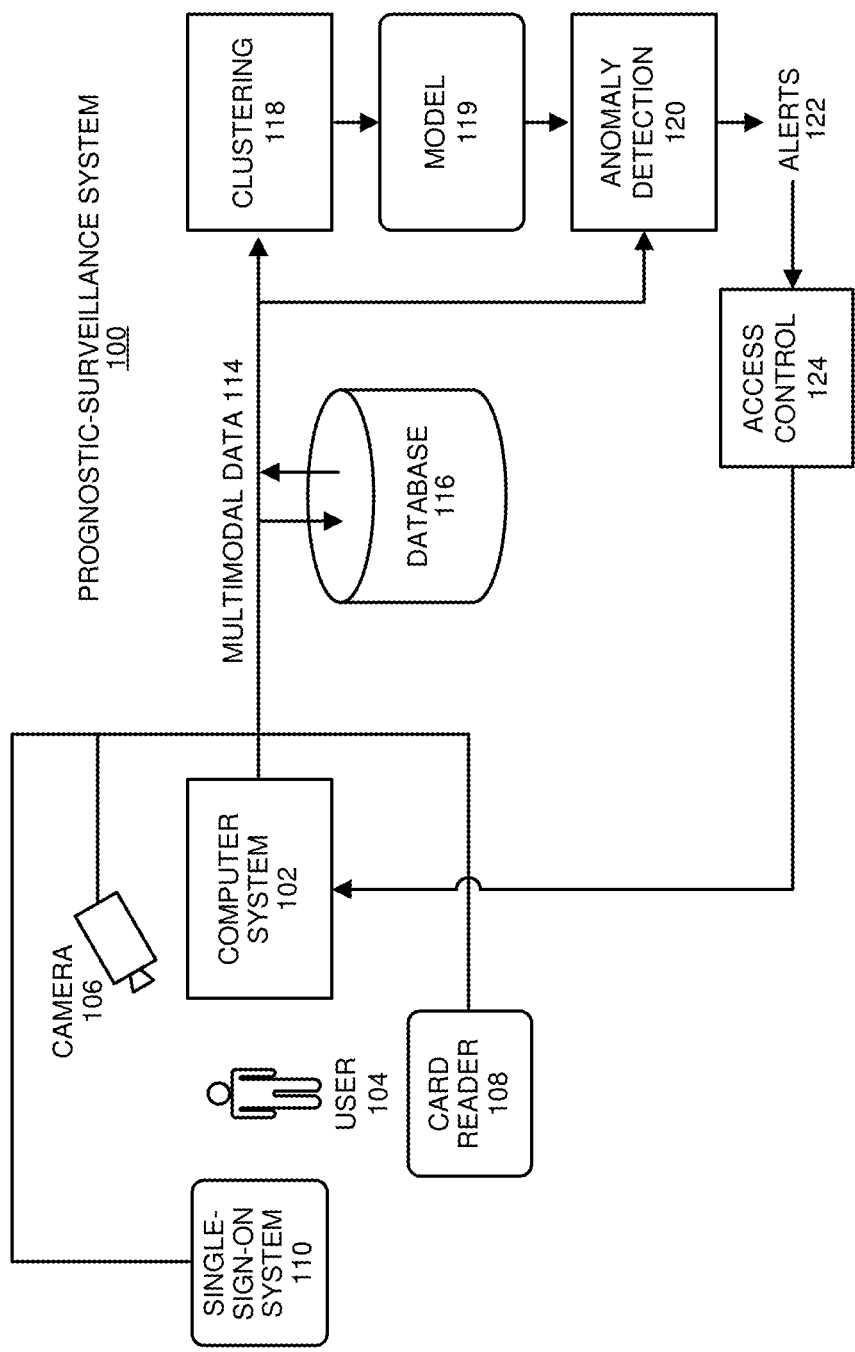
FIG. 1 illustrates an exemplary prognostic-surveillance system that monitors multimodal data in accordance with the disclosed embodiments.

FIG. 1 illustrates an exemplary prognostic-surveillance system 100 in accordance with the disclosed embodiments. During operation, prognostic-surveillance system 100 processes multimodal data 114, which is associated with a computer system 102. Multimodal data 114 can include different types of data, which can originate from computer system 102 or from devices associated with computer system 102, such as: a camera 106 that images a user 104 of computer system 102; a single-sign-on system 110 for computer system 102; or an access card reader 108 for a building that houses computer system 102. Multimodal data 114 can include multiple types of data, such as textual data; event data; numerical integer data; numerical floating-point data; audio data; and image data. Note that multimodal data 114 can be stored in a database 116 for subsequent processing.

During a training phase for prognostic-surveillance system 100, multimodal data 114, which can originate directly from devices associated with computer system 102 or from database 116, feeds into clustering module 118, which forms events in multimodal data 114 into clusters, which are used to generate a machine-learning model 119 that is subsequently used to classify events.

During a subsequent monitoring phase for prognostic-surveillance system 100, model 119 is used by anomaly detection module 120 to classify events in multimodal data 114 to detect various anomalies, such as a hardware failure; a software failure; an intrusion; a malicious activity; and a performance issue. If anomalies are detected, anomaly detection module 120 generates alerts 122. In response to an alert, the system can perform a remedial action, which can include: informing a system administrator about the anomaly and providing contextual information; scheduling execution of diagnostics and/or security scanning applications on the affected parts of the computer system; suspending affected users or services; enforcing multi-factor authentication for affected users or services; initiating service migration from affected parts of the system; taking actions to facilitate reallocation and/or rebalancing affected resources and services; modifying settings of firewalls to deny or throttle traffic to affected resources or services; or (as illustrated in FIG. 1) causing an access-control system 124 to provide feedback to computer system 102. For example, to deny user 104 access to a building if, user 104 failed to authenticate using card reader 108.

Multimodal Datasets

The disclosed embodiments operate on multimodal datasets comprising different types of data from different sources. For example, the table in FIG. 2 presents a multimodal dataset obtained from an event-logging system of a single-sign on service used by an identity-management system to control access to computer system resources. Each row in this table corresponds to a single event representing an authentication attempt by a user. The different attributes of the authentication events are arranged into columns, wherein the first column is a timestamp, the second is an IP address, and the third column is the resource URL. Note that some columns contain textual data that can be represented by strings (e.g., "resource"). Other columns contain numerical data or categorical data (e.g., "status"). Because this dataset contains different types of data, traditional machine-learning (ML) techniques cannot be used without first converting the different types of data into a format suitable for the ML techniques, most of which operate on purely numerical data or purely textual data.

To handle datasets with mixed data types, we introduce a concept called a "feature group." A feature group (FG) comprises a list of the columns of the dataset containing variables of the same data type with a distance function that is used to compare items of the data type.

Exemplary feature groups for the dataset that appears in the table in FIG. 2 can include: FG1={col3: Edit}; FG2={col4: Binary}; and FG3={col7, col8: Vincenty}. The first feature group FG1 includes a resource name variable (in column 3) and specifies a string edit-distance function "Edit." The second feature group FG2 includes a binary status variable (in column 4) and specifies a binary distance function "Binary." The third feature group FG3 includes numerical columns with latitude (column 7) and longitude (column8) and specifies a geodesic distance function "Vincenty," which computes a great-circle distance on a sphere representing the Earth. Note that each of these feature groups contains columns (variables) of the same type and specifies an appropriate distance function. A feature group descriptor (FGD) specifies a list of the feature groups for the given dataset, FGD={FG1, FG2, FG3}. We use the following notation to represent a dataset with a feature group descriptor: (D, FGD).

In a simple example, all data values are numerical and the feature group descriptor contains only one feature group, which contains all columns and specifies a Euclidean distance FG={$col_1$, $col_2$, . . . , $col_n$: Euclidean}. Other, more complicated examples of multimodal datasets include combinations of events from an SSO system, a virtual private network (VPN), a badge reader, a Wi-Fi system, an email server, and other sources of data that capture user activity.

For a dataset that does not include feature groups, the disclosed embodiments automatically create two feature groups, one for all of the numerical columns with a Euclidean distance function FG1={$col_{i1}$, $col_{i2}$, . . . , $col_{in}$: Euclidean}, and one for all non-numerical columns with a string edit-distance function FG2={$col_{j1}$, $col_{j2}$, . . . , $col_{jn}$: Edit}.

Feature Selection

In some embodiments, the system performs automatic feature selection and feature group formation. Exhaustive search can be used to determine an optimal number of feature groups and an optimal composition of the feature groups. However, an exhaustive search can be prohibitively expensive for exploring feature-rich datasets with a large number of distance functions. Hence, exhaustive search is only suggested as an exemplary technique for automated feature selection, and other feature-selection techniques known to those skilled in the art can be used.

For each feature group FG, the system computes a tripoint similarity matrix, denoted as $S_{FG}$. (See U.S. patent application Ser. No. 13/833,757, entitled "Per-Attribute Data Clustering Using Tri-Point Data Arbitration," by inventors Alan P. Wood, Aleksey M. Urmanov and Anton A. Bougaev, filed on Mar. 15, 2013, the "'757 application".) The matrix $S_{FG}$ is an n×n matrix, where n is the number of rows in the dataset. Each entry $S_{FG(i,j)}$ is computed as follows:

$$S_{FG(i,j)} = TPC(X_i, X_j, A) = 1/|A| SUM\{TPC(X_i, X_j, A_k)\},$$

and the tripoint coefficient function TPC( ) is defined as $$TPC(X_i, X_j, A_k) = (\min(d(X_i, A_k), d(X_j, A_k)) - d(X_i, X_j))/\max(\min(d(X_i, A_k), d(X_j, A_k)), d(X_i, X_j)),$$

where X is a data matrix composed of the columns defined in the feature group FG, and d( ) is the feature group distance function. Note that X includes n rows and has a number of columns equal to the number of columns defined in the feature group. Each entry of X contains a data value corresponding to the data type of the column (e.g., numerical, string, etc.). A is the set of arbiters, wherein an arbiter is a data row. In one embodiment A=X, which means that A comprises the set of all data rows of the dataset.

Sampling of Arbiters

For large datasets with tens of thousands to tens of millions and more rows, the computation of the feature group similarity matrices using all the rows as arbiters may take a long time and may not actually be necessary. For such large datasets, arbiter sampling can be used to iteratively compute the similarity matrix using arbiter batches of fixed size sampled from the dataset. During this process, different sampling strategies can be using, such as: sequential uniform, sequential exponential, random uniform, and random exponential. For uniform sampling strategies, the batch size is fixed. For exponential arbiter sampling strategies the batch size increases exponentially.

With arbiter sampling, the tripoint similarity matrix can be updated during each iteration using the following equation $$s_{new} = s_{prev} \times N/(N+n) + s_{update} \times n/(N+n)$$

where $s_{new}$ is the new similarity value at the end of the current iteration (and the (i,j)-th entry of the similarity matrix), $s_{prev}$ is the similarity value at the previous iteration, N is the total number of points used up to the previous iteration, n is the size of the batch of the current iteration, and $s_{update}$ is the similarity value computed using the data in the current iteration batch only.

The stopping criterion for arbiter sampling can be based on the number of sign changes of the entries of the similarity matrix at each iteration. The sign change criterion is effective because the partitioning technique used for finding clusters exploits only the sign of the similarities, so that the exact similarity values are not going to change the result of clustering noticeably.

Feature Group Sparse Tripoint Similarity Matrices

Note that traditional sparse matrices, which are used for space-saving purposes and to reduce the number of computations, are not applicable to similarity matrices because similarity matrices tend to be dense. Hence, we make use of a new sparse matrix structure for the tripoint similarity matrix, which is optimized for the tripoint-based clustering analysis. The size of this new sparse matrix is fixed by specifying the number of columns of the matrix for each of the n rows of the dataset. Let k denote the specified number of columns of the sparse matrix. Each row contains similarity values corresponding to the k nearest neighbor rows of the given row. Note that an additional n×k matrix C of column indices keeps the indices of the actual nearest neighbor rows. Hence, the resulting structure, which includes one n×k matrix V with double entries, and one n×k matrix C with integer values, is called a k-column nearest-neighbor sparse similarity matrix. FIG. 3 illustrates an exemplary k-column nearest-neighbor sparse similarity matrix. Note that the matrix V contains selected similarity values v(i,j) of the full similarity matrix S. For each row i, only k values of similarity to its k nearest neighbor rows are maintained, and the indices of the nearest-neighbor rows are stored in the matrix C. This means the v(i,j) entry of matrix V stores the value of s(i,c(i,j)).

While building this sparse similarity matrix, the system uses a fast nearest-neighbor search to find nearest neighbors for each row. In one embodiment, Vantage Point trees are constructed and used to perform the fast search for nearest neighbors in sub-linear time. (See Yianilos (1993), Data structures and algorithms for nearest neighbor search in general metric spaces, Fourth Annual ACM-SIAM Symposium on Discrete Algorithms. Society for Industrial and Applied Mathematics, Philadelphia, Pa., USA. pp. 311-321.)

Crossmodal Tripoint Similarity Matrices

Each feature group similarity matrix represents the similarity of rows within the feature group. To perform clustering analysis of the dataset, the system aggregates the similarity matrices computed within each feature group into an overall, crossmodal similarity matrix using the following aggregation rules.

Given feature group similarity matrices $S_{FG1}$, $S_{FG2}$, ..., $S_{FGng}$ (where ng is the number of feature groups), the crossmodal tripoint similarity matrix, denoted as $S_{CM}$, is computed as specified by the pseudocode illustrated in FIG. 7. However, a few corner cases must be handled separately. If both combined entries are equal to 1.0, then the combined similarity value is set to 1.0. If one of the combined entries is equal to 1.0, then the combined similarity value is set to the other similarity value.

The above similarity aggregation rules assure that the crossmodal similarity values range between −1.0 and 1.0 and the resulting crossmodal similarity values correctly summarize and balance the feature group similarities (and/or modal similarities) based on the contribution of each feature group.

Crossmodal Sparse Tripoint Similarity Matrices

When more than one feature group is defined, the k nearest neighbors of row i can be different in each feature group. To keep similarity information from all feature groups in the crossmodal sparse matrix, the number of columns used in the k-column nearest-neighbor sparse matrices is increased to a maximum of k×(the number of feature groups). This matrix with an increased number of columns is called a sparse crossmodal k×ng-column nearest-neighbor tripoint similarity matrix. Note that each row in this matrix has the maximum length of k×ng, but can be shorter if the row has same nearest neighbors in several feature groups.

When computing the sparse crossmodal k×ng-column nearest-neighbor tripoint similarity matrix, the first step is to build Vantage Point trees for each feature group, which are used to find k nearest neighbors for each row in each feature group. For each row, the row indices of the nearest neighbors from each feature group are then combined into one set of indices of nearest neighbors. As mentioned above, the maximum size of the set is k×ng. When the indices of up to k×ng nearest neighbors are known, the feature group matrices and the crossmodal matrix are initialized by pre-filling the C part of the matrix with the corresponding indices of nearest neighbors for each row. The system then computes the similarity values for the entries of the feature group sparse similarity matrices. In a final step, the system combines the feature group matrices into the crossmodal sparse similarity matrix.

Figure 4:
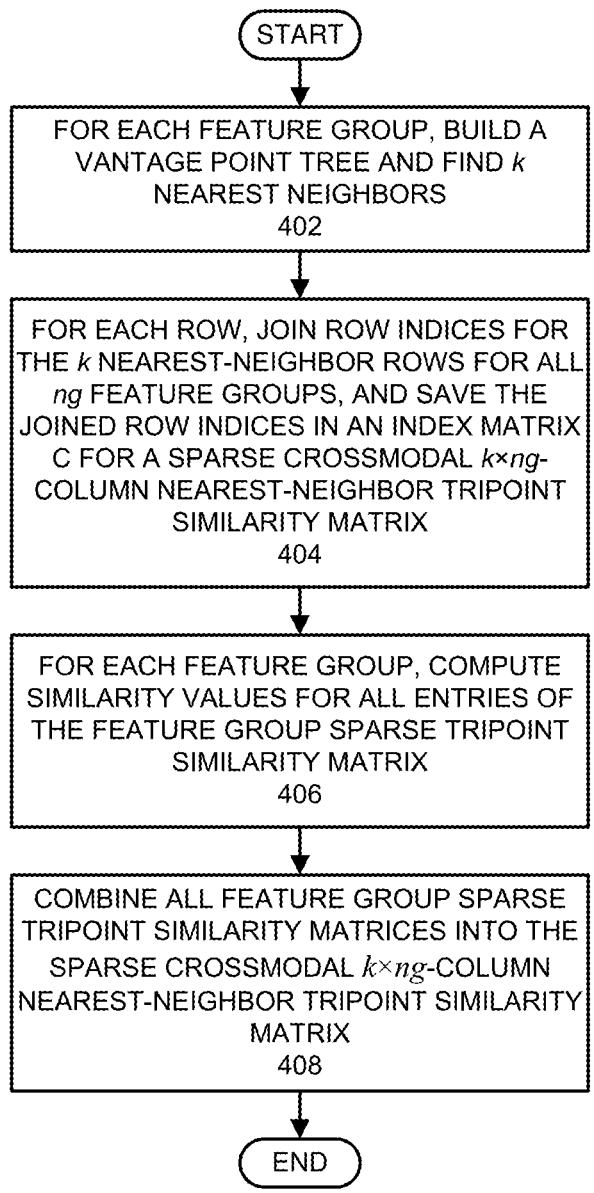
FIG. 4 presents a flow chart illustrating the process of performing prognostic-surveillance operations using multimodal data in accordance with the disclosed embodiments.

More specifically, FIG. 4 presents a flow chart illustrating the process of forming a multimodal sparse similarity matrix in accordance with the disclosed embodiments. First, for each feature group in the set of ng feature groups, the system builds a vantage point tree and finds k nearest neighbors (step 402). Next, for each row, the system joins row indices for the k nearest-neighbor rows for all ng feature groups, and saves the joined row indices in an index matrix C for a sparse crossmodal k×ng-column nearest-neighbor tripoint similarity matrix (step 404). Then, for each feature group, the system computes similarity values for all entries of the feature group sparse tripoint similarity matrix (step 406). Finally, the system combines all feature group sparse tripoint similarity matrices into the sparse crossmodal k×ng-column nearest-neighbor tripoint similarity matrix (step 408).

Chained Staged Crossmodal Sparse Tripoint Similarity Matrices

To cluster very large datasets with millions and billions of rows, the system creates a sequence of progressively smaller size sparse matrices (with fewer rows), called "stages." These stages are chained together through representatives, which are rows that relate the current stage to the next stage, wherein the next stage is composed of the representative rows of the current stage.

Figure 5:
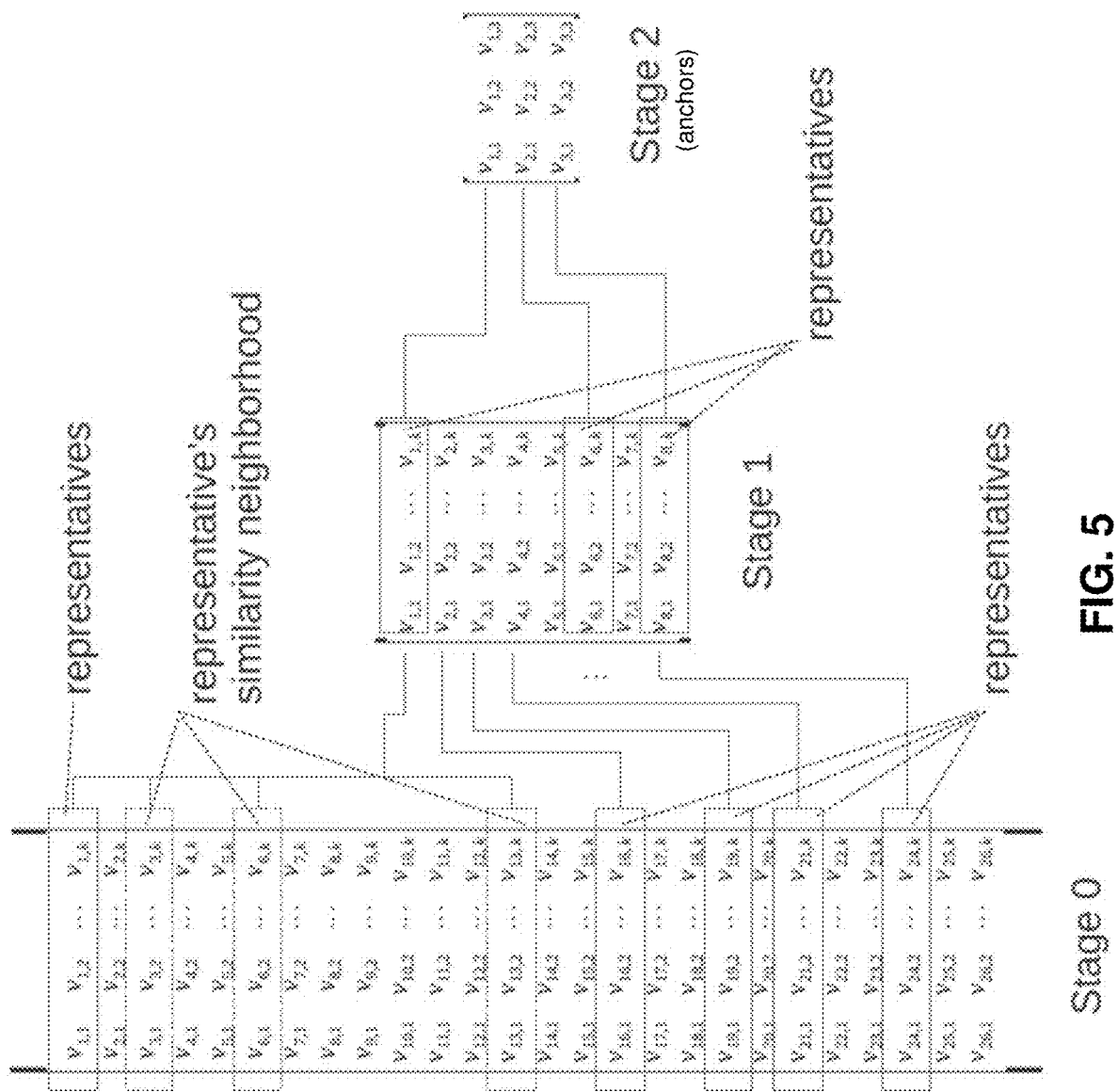
FIG. 5 illustrates chained stages of a sparse similarity matrix in accordance with the disclosed embodiments.

FIG. 5 illustrates the chained stages of an exemplary sparse similarity matrix. The staged sparse similarity matrix illustrated in FIG. 5 is comprised of a set of non-staged similarity matrices. Stage 0 is the full row sparse similarity matrix computed using the full dataset. From stage 0, a set of representative rows is selected, which become rows of stage 1. The similarity values of the stage 1 matrix are computed in the same way as for the non-staged sparse matrices using the selected data rows from the original dataset. (Not shown on the diagram is an additional array that maps the row indices of stage 1 to rows of stage 0.) From stage 1, representatives are selected to form the rows of stage 2. The rows of the last stage, which in this example is stage 2, are called "anchors." Note that there also exists an array that stores the mapping of rows in stage 2 to rows in stage 1. All stages except the final stage are k-column nearest-neighbor sparse similarity matrices, and the final stage is a dense similarity matrix.

Note that each representative row has a "similarity neighborhood" associated with it, wherein the similarity neighborhood of a representative row comprises rows that are similar to the representative row. During the staging process, each stage is split into similarity neighborhoods and one representative from each similarity neighborhood transfers to the next stage. Once the representative rows for stage i are determined, the corresponding indices of the rows in the dataset are retrieved from the mapping arrays and a data subset is created from the original dataset. This data subset is used to build the stage i+1 similarity matrix. In the last stage, the data subset is used to build a dense tripoint similarity matrix of anchors.

Figure 6:
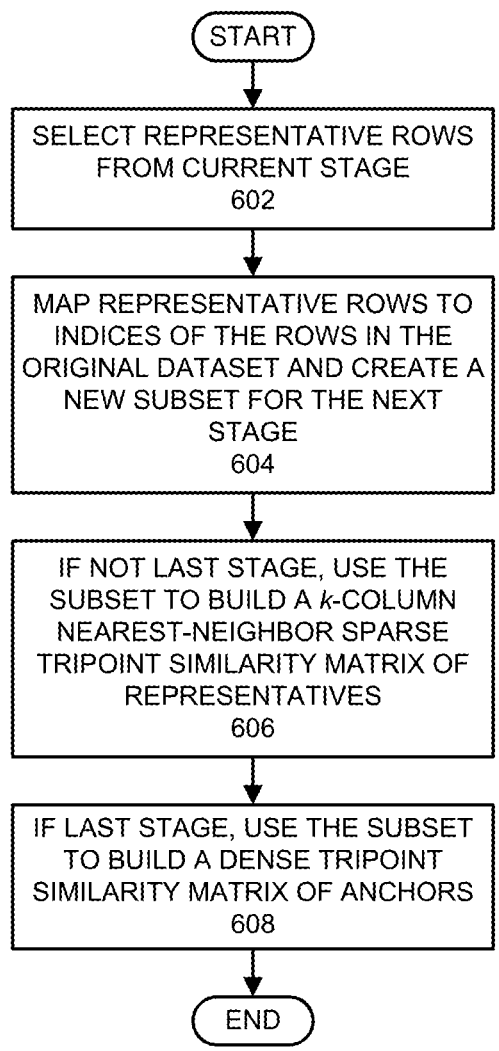
FIG. 6 presents a flow chart illustrating the process of forming stages for the sparse similarity matrix in accordance with the disclosed embodiments.

More specifically, FIG. 6 presents a flow chart illustrating the process of forming stages for the sparse similarity matrix in accordance with the disclosed embodiments. First, the system selects representative rows from the current stage (step 602). Next, the system maps representative rows to indices of the rows in the original dataset and creates a new subset for the next stage (step 604). If this is not the last stage, the system uses the subset to build a k-column nearest-neighbor sparse tripoint similarity matrix of representatives (step 606). Finally, if this is the last stage, the system uses the subset to build a dense tripoint similarity matrix of anchors (step 608).

The pseudocode, which appears in FIGS. 7-11, collectively performs clustering operations for a multimodal dataset by constructing a staged crossmodal k-column nearest-neighbor sparse tripoint similarity matrix and labeling the data rows.

Power Iteration Partitioning of Similarity Anchors

When clustering a dataset, the system iteratively attempts to split the clusters from the current set of clusters into more clusters. After splitting a cluster, the system checks if the new clusters are similar to each other. If they are not similar, the system expands the current list of clusters with the new clusters. The splitting of the clusters can be done in a number of different ways, as long as the resulting new clusters satisfy the clustering criteria—the points in the same cluster must be similar and the points from different clusters must be dissimilar.

The clustering criteria can be formulated in terms of the tripoint similarity as described in the '757 application. During the clustering process, a cluster is split into two or more clusters such that the resulting clusters are pairwise dissimilar. The cross-cluster similarity is computed in the following way. Given n points $\{X_1, X_2, \ldots, X_n\}$ and the multimodal tripoint similarity matrix $S_{CM}$, and clusters $\{C_1, C_2, \ldots, C_m\}$, the cross-cluster similarity is computed as $$SIM(C1,C2)=1/n_{12}SUM_{\{i \text{ in } C1\}}SUM_{\{j \text{ in } C2\}}S_{CM(i,j)},$$

where $n_{12}$ is the number of pairs of points in C1 and C2.

To split a cluster into two or more clusters, the system can use a spectral partitioning approach in which a split objective is selected and a spectral relaxation method is used to solve the optimal split. In one embodiment, the RatioCut split objective is used. (See Ulrike von Luxburg, A Tutorial on Spectral Clustering, Technical Report No. TR-149, Max Planck Institute for Biological Cybernetics, August 2006.) Note that a "cut objective" is specified as the number of edges (the cut), or the sum of the corresponding weights that one needs to cut to separate a fully connected graph into two unconnected graphs.

In the current setting, the tripoint similarity matrix $S_{CM}$ can be interpreted as a graph connectivity matrix, wherein each row of the dataset is a vertex of the graph, and each entry of the similarity matrix is an edge with a weight. By finding an optimal cut, we split one cluster into two clusters such that the cross-cluster similarity is minimized, which is a desirable clustering criterion.

The RatioCut objective balances the size and the sizes of the two partitions $$RatioCut(C1,C2)=cut(C1,C2)(1/|C1|+1/|C2|),$$

where $cut(C1,C2)=SUM_{ij}(S_{CM(i,j)})$, i in C1 and j in C2.

The problem of finding the optimal cut (subset of edges to cut) is a computationally expensive optimization problem and can be solved approximately by relaxing the integral requirement on the partition indicator variables $p_i=0/1$. The indicator variables are replaced by continuous variables $pwave_i=0 \ldots 1$. Then the relaxed problem is solved for the $pwave_i$, and the $pwave_i$ are mapped back to partition indicators 0/1.

The relaxed problem can be solved through spectral methods by constructing the Laplacian corresponding to the split objective and finding the eigenvector of the Laplacian corresponding to the second smallest eigenvalue. The second eigenvector minimizes the relaxed problem. By using the sign of the entries of the second eigenvector, the mapping to the partition indicator variable is completed. (In one embodiment, the power iteration method is used to find the second eigenvector of the Laplacian.)

Given the crossmodal similarity matrix $S_{CM}$, the first step is to zero all the negative entries because the spectral methods assume nonnegative entries of the connectivity matrix. Denote the similarity matrix with zeroed negative entries as A. The next step is to construct the Laplacian using the RatioCut objective L=D−A, where D is the diagonal matrix with diagonal entries equal to the sum of the columns $d_{ii}=SUM_j(A(i,j))$. In one variation, to save storage space the Laplacian values are computed on-the-fly from the values of $S_{CM}$ so no extra storage is used by A and L.

Power iteration is a technique for finding eigenvalues/eigenvectors iteratively. (See Golub, Matrix computation, $3^{rd}$ edition, The Johns Hopkins University Press, 1996.) It finds the dominant eigenvalue by producing a sequence of vectors $q^k$ as follows $z^k=A \times q^{k-1}$; $q^k=z^k/\|z^k\|$, where A is a symmetric matrix and $q^0$ is a unit 2-norm vector. To find the eigenvector corresponding to the second smallest eigenvalue of A, the problem needs some modification. First, we find the smallest eigenvector by shifting the eigenvalues of A as $A-lam_{max} \times I$, where I is an identity matrix and $lam_{max}$ is the largest eigenvalue. Since power iteration finds the largest eigenvalues based on the magnitude of the eigenvalues, the largest eigenvalues will be at or close to zero and the smallest will now be the largest in magnitude.

In addition to shifting the eigenvalues, we introduce an optimization to remove the first eigenvector before power iteration. The first eigenvector and eigenvalue of the Laplacian matrix is constant and is computed by the following equations:

$$lam_0=0.0; x0=1/SQRT(\text{number of rows}).$$

Both the eigenvalue shift and smallest constant vector removal were combined in one operation to increase performance. The following is a simplified version of both operations $$B=lam_{max}(I-x_0 \times x_0^T)-A.$$

Note that the largest eigenvector of B found by power iteration corresponds to the second smallest eigenvector of the original matrix A. Next, using the sign of the entries of the second smallest eigenvector, the rows are assigned to one of the two partitions, and the entries with zero are resolved to either partition.

EXAMPLE

Figure 12:
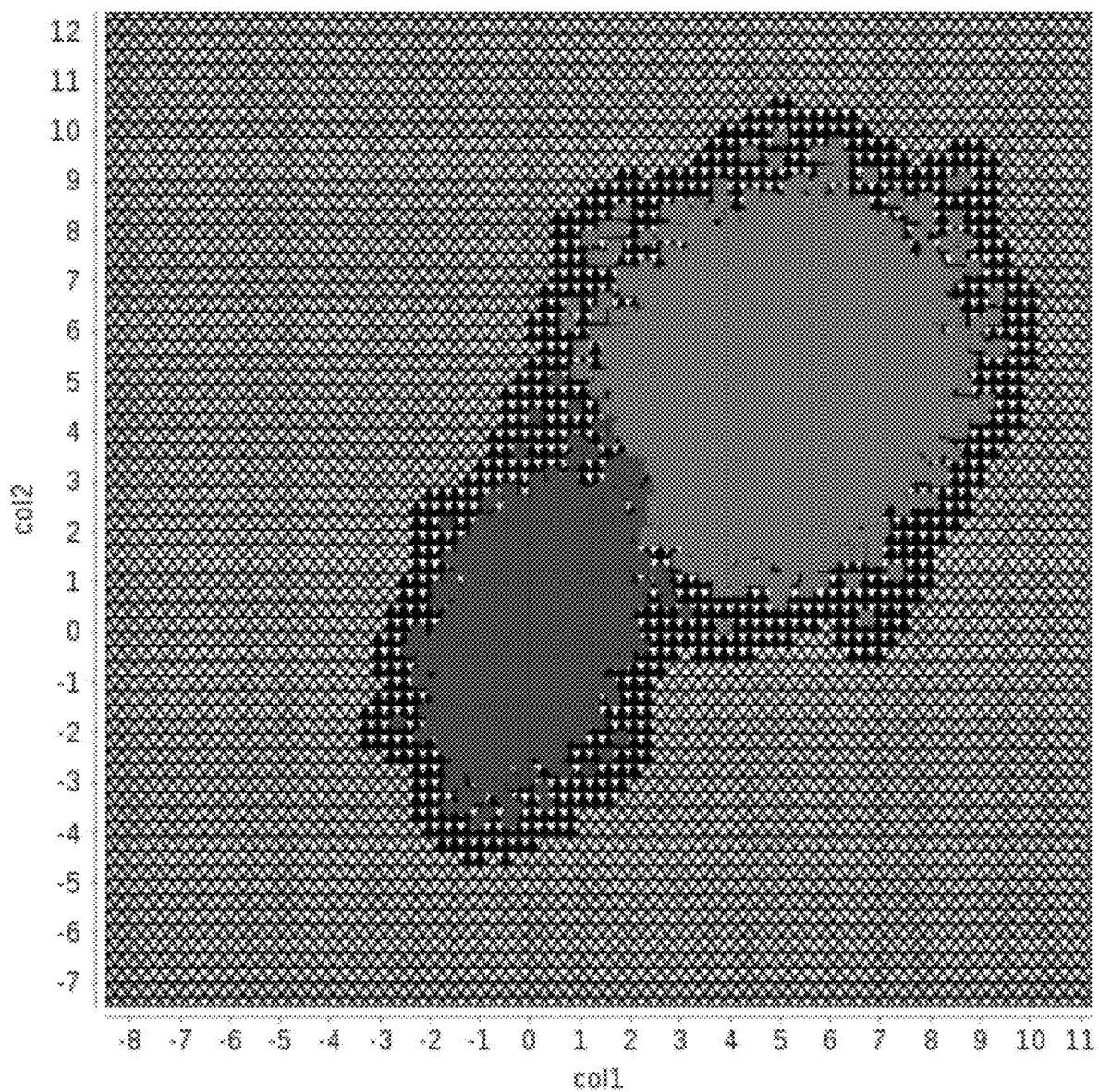
FIG. 12 illustrates an exemplary clustering of a multimodal dataset in accordance with the disclosed embodiments.

FIG. 12 illustrates a simple exemplary clustering, wherein the number of points was limited to 20,000 to keep the plot readable. The plot shows two clusters with light grey and dark grey shading. The filled and open triangles indicate normal versus anomalous points when the resulting clusters are used for anomaly detection.

Performing Prognostic-Surveillance Operations Using Multimodal Data

Figure 13:
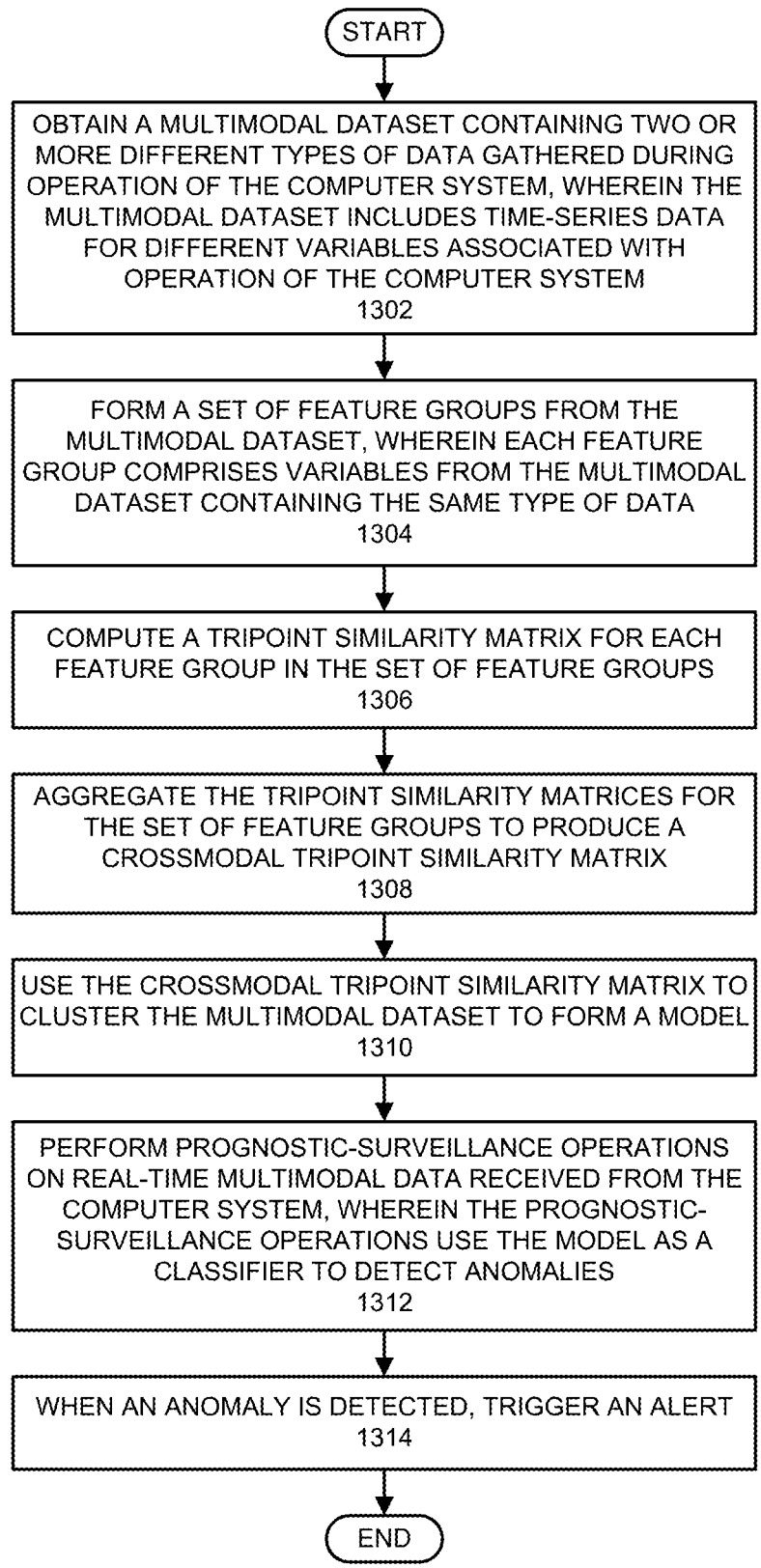
FIG. 13 presents a flow chart illustrating the process of forming a multimodal sparse similarity matrix in accordance with the disclosed embodiments.

FIG. 13 presents a flow chart illustrating the process of performing prognostic-surveillance operations using multimodal data in accordance with the disclosed embodiments. During operation, the system obtains a multimodal dataset containing two or more different types of data gathered during operation of the computer system, wherein the multimodal dataset includes time-series data for different variables associated with operation of the computer system (step 1302). Next, the system forms a set of feature groups from the multimodal dataset, wherein each feature group comprises variables from the multimodal dataset containing the same type of data (step 1304). The system then computes a tripoint similarity matrix for each feature group in the set of feature groups (step 1306), and aggregates the tripoint similarity matrices for the set of feature groups to produce a crossmodal tripoint similarity matrix (step 1308). Next, the system uses the crossmodal tripoint similarity matrix to cluster the multimodal dataset to form a model (step 1310). The system then performs prognostic-surveillance operations on real-time multimodal data received from the computer system, wherein the prognostic-surveillance operations use the model as a classifier to detect anomalies (step 1312). Finally, when an anomaly is detected, the system triggers an alert (step 1314).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing prognostic-surveillance operations on a computer system, comprising:
    obtaining a multimodal dataset containing two or more different types of data gathered during operation of the computer system, wherein:
        the multimodal dataset includes time-series data for different variables associated with operation of the computer system; and
        the multimodal dataset comprises a table with n rows, wherein each of the n rows represents an event, and wherein each column of the table contains data values for a single variable;
    forming a set of ng feature groups from the multimodal dataset, wherein each feature group comprises variables from the multimodal dataset containing the same type of data;
    computing a tripoint similarity matrix for each feature group in the set of feature groups, wherein the tripoint similarity matrix for each of the feature groups is a sparse n×k tripoint similarity matrix V with n rows, wherein each row contains k similarity values for k nearest-neighbor rows of the row, and wherein indices for the nearest-neighbor rows are stored in an associated n×k index matrix C;
    aggregating the tripoint similarity matrices for the set of feature groups to produce a crossmodal tripoint similarity matrix by:
        for each feature group, finding k nearest neighbors;
        for each row, joining row indices for the k nearest-neighbor rows for all ng feature groups, and saving the joined row indices in an index matrix C for a sparse crossmodal k×ng-column nearest-neighbor tripoint similarity matrix;
        for each feature group, computing similarity values for all entries of the feature group sparse tripoint similarity matrix; and
        combining all feature group sparse tripoint similarity matrices into the sparse crossmodal k×ng-column nearest-neighbor tripoint similarity matrix;
    using the crossmodal tripoint similarity matrix to cluster the multimodal dataset to form a model;
    performing prognostic-surveillance operations on real-time multimodal data received from the computer system, wherein the prognostic-surveillance operations use the model as a classifier to detect anomalies; and
    when an anomaly is detected, triggering an alert.

2. The method of claim 1, wherein the method further comprises reducing a number of rows in a sparse similarity matrix by using an iterative staging process, wherein each iterative stage replaces neighborhoods of similar rows with representative rows.

3. The method of claim 1, wherein aggregating the tripoint similarity matrices for the set of feature groups involves combining similarity values from the tripoint similarity matrices for the set of feature groups, wherein while combining two similarity values to produce a resulting similarity value:
    when the two similarity values are both positive, the resulting similarity value is greater than either of the two similarity values and is less than 1.0;
    when the two similarity values are both negative, the resulting similarity value is less than either of the two similarity values and is greater than −1.0; and
    when the two similarity values have different signs, the resulting similarity value has the sign of the largest-magnitude of the two similarity values, and the absolute value of the resulting similarity value is smaller than the absolute value of the largest-magnitude similarity value.

4. The method of claim 1, wherein clustering the multimodal dataset involves using a tripoint clustering technique.

5. The method of claim 1, wherein the different types of data in the multimodal dataset include two or more of the following:
    textual data;
    event data;
    numerical integer data;
    numerical floating-point data;
    audio data; and
    image data.

6. The method of claim 1, wherein the different types of data in the multimodal dataset originate from two or more of the following:
    a badge reader for a building that houses the computer system;
    a Wi-Fi system associated with the computer system;
    a single-sign-on (SSO) system associated with the computer system;
    an email server for the computer system;
    textual data in the computer system;
    a biometric reader for physical access; and
    numerical data in the computer system.

7. The method of claim 1, wherein a detected anomaly indicates one of the following:
    a hardware failure;
    a software failure;
    an intrusion;
    a malicious activity; and
    a performance issue.

8. The method of claim 1, wherein when an anomaly is detected, the method further comprises performing a remedial action, which can include one of the following:
- informing a system administrator about the anomaly and providing contextual information;
- scheduling execution of diagnostics and/or security scanning applications on the affected parts of the computer system;
- suspending affected users or services;
- enforcing multi-factor authentication for affected users or services;
- initiating service migration from affected parts of the system;
- taking actions to facilitate reallocation and/or rebalancing affected resources and services; and
- modifying settings of firewalls to deny or throttle traffic to affected resources or services.

9. A non-transitory, computer-readable storage medium storing instructions that when executed by a computer cause the computer to perform a method for performing prognostic-surveillance operations on a computer system, the method comprising:
- obtaining a multimodal dataset containing two or more different types of data gathered during operation of the computer system, wherein:
  - the multimodal dataset includes time-series data for different variables associated with operation of the computer system; and
  - the multimodal dataset comprises a table with n rows, wherein each of the n rows represents an event, and wherein each column of the table contains data values for a single variable;
- forming a set of ng feature groups from the multimodal dataset, wherein each feature group comprises variables from the multimodal dataset containing the same type of data;
- computing a tripoint similarity matrix for each feature group in the set of feature groups, wherein the tripoint similarity matrix for each of the feature groups is a sparse n×k tripoint similarity matrix V with n rows, wherein each row contains k similarity values for k nearest-neighbor rows of the row, and wherein indices for the nearest-neighbor rows are stored in an associated n×k index matrix C;
- aggregating the tripoint similarity matrices for the set of feature groups to produce a crossmodal tripoint similarity matrix by:
  - for each feature group, finding k nearest neighbors;
  - for each row, joining row indices for the k nearest-neighbor rows for all ng feature groups, and saving the joined row indices in an index matrix C for a sparse crossmodal k×ng-column nearest-neighbor tripoint similarity matrix;
  - for each feature group, computing similarity values for all entries of the feature group sparse tripoint similarity matrix; and
  - combining all feature group sparse tripoint similarity matrices into the sparse crossmodal k×ng-column nearest-neighbor tripoint similarity matrix;
- using the crossmodal tripoint similarity matrix to cluster the multimodal dataset to form a model;
- performing prognostic-surveillance operations on real-time multimodal data received from the computer system, wherein the prognostic-surveillance operations use the model as a classifier to detect anomalies; and
- when an anomaly is detected, triggering an alert.

10. The non-transitory, computer-readable storage medium of claim 9, wherein the method further comprises reducing a number of rows in a sparse similarity matrix by using an iterative staging process, wherein each iterative stage replaces neighborhoods of similar rows with representative rows.

11. The non-transitory, computer-readable storage medium of claim 9, wherein aggregating the tripoint similarity matrices for the set of feature groups involves combining similarity values from the tripoint similarity matrices for the set of feature groups, wherein while combining two similarity values to produce a resulting similarity value:
- when the two similarity values are both positive, the resulting similarity value is greater than either of the two similarity values and is less than 1.0;
- when the two similarity values are both negative, the resulting similarity value is less than either of the two similarity values and is greater than −1.0; and
- when the two similarity values have different signs, the resulting similarity value has the sign of the largest-magnitude of the two similarity values, and the absolute value of the resulting similarity value is smaller than the absolute value of the largest-magnitude similarity value.

12. The non-transitory, computer-readable storage medium of claim 9, wherein clustering the multimodal dataset involves using a tripoint clustering technique.

13. A system that performs prognostic-surveillance operations on a computer system, comprising:
- at least one processor and at least one associated memory; and
- an anomaly detection mechanism that executes on the at least one processor, wherein during operation, the anomaly detection mechanism:
  - obtains a multimodal dataset containing two or more different types of data gathered during operation of the computer system, wherein:
    - the multimodal dataset includes time-series data for different variables associated with operation of the computer system; and
    - the multimodal dataset comprises a table with n rows, wherein each of the n rows represents an event, and wherein each column of the table contains data values for a single variable;
  - forms a set of ng feature groups from the multimodal dataset, wherein each feature group comprises variables from the multimodal dataset containing the same type of data;
  - computes a tripoint similarity matrix for each feature group in the set of feature groups, wherein the tripoint similarity matrix for each of the feature groups is a sparse n×k tripoint similarity matrix V with n rows, wherein each row contains k similarity values for k nearest-neighbor rows of the row, and wherein indices for the nearest-neighbor rows are stored in an associated n×k index matrix C;
  - aggregates the tripoint similarity matrices for the set of feature groups to produce a crossmodal tripoint similarity matrix by:
    - for each feature group, finding k nearest neighbors;
    - for each row, joining row indices for the k nearest-neighbor rows for all ng feature groups, and saving the joined row indices in an index matrix C for a sparse crossmodal k×ng-column nearest-neighbor tripoint similarity matrix;

for each feature group, computing similarity values for all entries of the feature group sparse tripoint similarity matrix; and combining all feature group sparse tripoint similarity matrices into the sparse crossmodal k×ng-column nearest-neighbor tripoint similarity matrix;

uses the crossmodal tripoint similarity matrix to cluster the multimodal dataset to form a model;

performs prognostic-surveillance operations on real-time multimodal data received from the computer system, wherein the prognostic-surveillance operations use the model as a classifier to detect anomalies; and when an anomaly is detected, triggers an alert.

14. The system of claim 13, wherein the system additionally reduces a number of rows in a sparse similarity matrix by using an iterative staging process, wherein each iterative stage replaces neighborhoods of similar rows with representative rows.

15. The system of claim 13, wherein aggregating the tripoint similarity matrices for the set of feature groups involves combining similarity values from the tripoint similarity matrices for the set of feature groups, wherein while combining two similarity values to produce a resulting similarity value:

when the two similarity values are both positive, the resulting similarity value is greater than either of the two similarity values and is less than 1.0;

when the two similarity values are both negative, the resulting similarity value is less than either of the two similarity values and is greater than −1.0; and when the two similarity values have different signs, the resulting similarity value has the sign of the largest-magnitude of the two similarity values, and the absolute value of the resulting similarity value is smaller than the absolute value of the largest-magnitude similarity value.

16. The system of claim 13, wherein clustering the multimodal dataset involves using a tripoint clustering technique.

17. The system of claim 13, wherein the different types of data in the multimodal dataset include two or more of the following:

textual data;
event data;
numerical integer data;
numerical floating-point data;
audio data; and
image data.

18. The system of claim 13, wherein the different types of data in the multimodal dataset originate from two or more of the following:

a badge reader for a building that houses the computer system;
a Wi-Fi system associated with the computer system;
a single-sign-on (SSO) system associated with the computer system;
an email server for the computer system;
textual data in the computer system;
a biometric reader for physical access; and
numerical data in the computer system.

19. The system of claim 13, wherein a detected anomaly indicates one of the following:

a hardware failure;
a software failure;
an intrusion;
a malicious activity; and
a performance issue.

20. The system of claim 13, wherein when an anomaly is detected, the method further comprises performing a remedial action, which can include one of the following:

informing a system administrator about the anomaly and providing contextual information;
scheduling execution of diagnostics and/or security scanning applications on the affected parts of the computer system;
suspending affected users or services;
enforcing multi-factor authentication for affected users or services;
initiating service migration from affected parts of the system;
taking actions to facilitate reallocation and/or rebalancing affected resources and services; and
modifying settings of firewalls to deny or throttle traffic to affected resources or services.

* * * * *